United States Patent [19]

Hutchinson et al.

[11] Patent Number: 4,875,275

[45] Date of Patent: Oct. 24, 1989

[54] NOVEL AUTOMATIC TOOL CHANGER

[75] Inventors: James Hutchinson, Doylestown, Pa.; Brian Hoffman, Somerville, N.J.; Steven Pollack, Washington Crossing, Pa.

[73] Assignee: Megamation Incoporated, Princeton, N.J.

[21] Appl. No.: 129,454

[22] Filed: Dec. 7, 1987

[51] Int. Cl.[4] .................. B23Q 41/00; B23Q 5/34; B23Q 31/10

[52] U.S. Cl. .................................. 29/568; 279/93; 279/97

[58] Field of Search .............. 29/568; 279/1 A, 1 T, 279/1 TS, 97, 93; 408/239 A, 239 R; 409/234; 40/913, 625, 628, 636; 901/30, 31; 403/44, 45, 46, 161, 162, 163, 167, 335, 349

[56] References Cited

U.S. PATENT DOCUMENTS

| 4,525,918 | 7/1985 | Puritz | 29/568 |
|---|---|---|---|
| 4,588,339 | 5/1986 | Bilz | 29/568 |
| 4,604,787 | 8/1986 | Silvers | 901/30 |
| 4,615,101 | 10/1986 | Edwards et al. | 29/568 |
| 4,648,171 | 3/1987 | Yasukawa | 29/568 |
| 4,674,172 | 6/1987 | Botimer | 29/568 |
| 4,676,142 | 6/1987 | McCormick et al. | 901/30 |

Primary Examiner—Bruce Y. Arnold
Assistant Examiner—Ronald M. Kachmarik
Attorney, Agent, or Firm—Louis Weinstein

[57] ABSTRACT

A tool changer including male and female flanges for respectively connecting end effectors to robot arms and the like. A male flange assembly having a tapered projection is inserted into a tapered female flange member having a rod aligned along the diameter of the tapered opening. A rotatably mounted locking stud is aligned within an opening in the male tapered projection and is machined to provide a slot having locking grooves as its lower end. The stud is rotated through a 35 degree angle causing the male and female flanges to be drawn together until the cooperating tapers are seated together. A spring retains the flanges in the locked position. A cooperating pin and pin receiving socket respectively provided on the male and female flanges at locations displaced from the male and female tapers are utilized to assure the proper orientation between flanges and to prevent rotation of the flanges. Spring loaded electrical terminals provided on the male connecting flange firmly engage cooperating conductive terminals fixedly mounted upon the female flange to complete an electrical path between electrical sources and load utilization devices forming part of the end effectors. Pneumatic couplings are provided by means of tapered projections arranged on the male flange and cooperating tapered openings provided on the female flange. O-rings arranged on grooves on each of the tapered projections provide air-tight seals between the coupling.

29 Claims, 4 Drawing Sheets

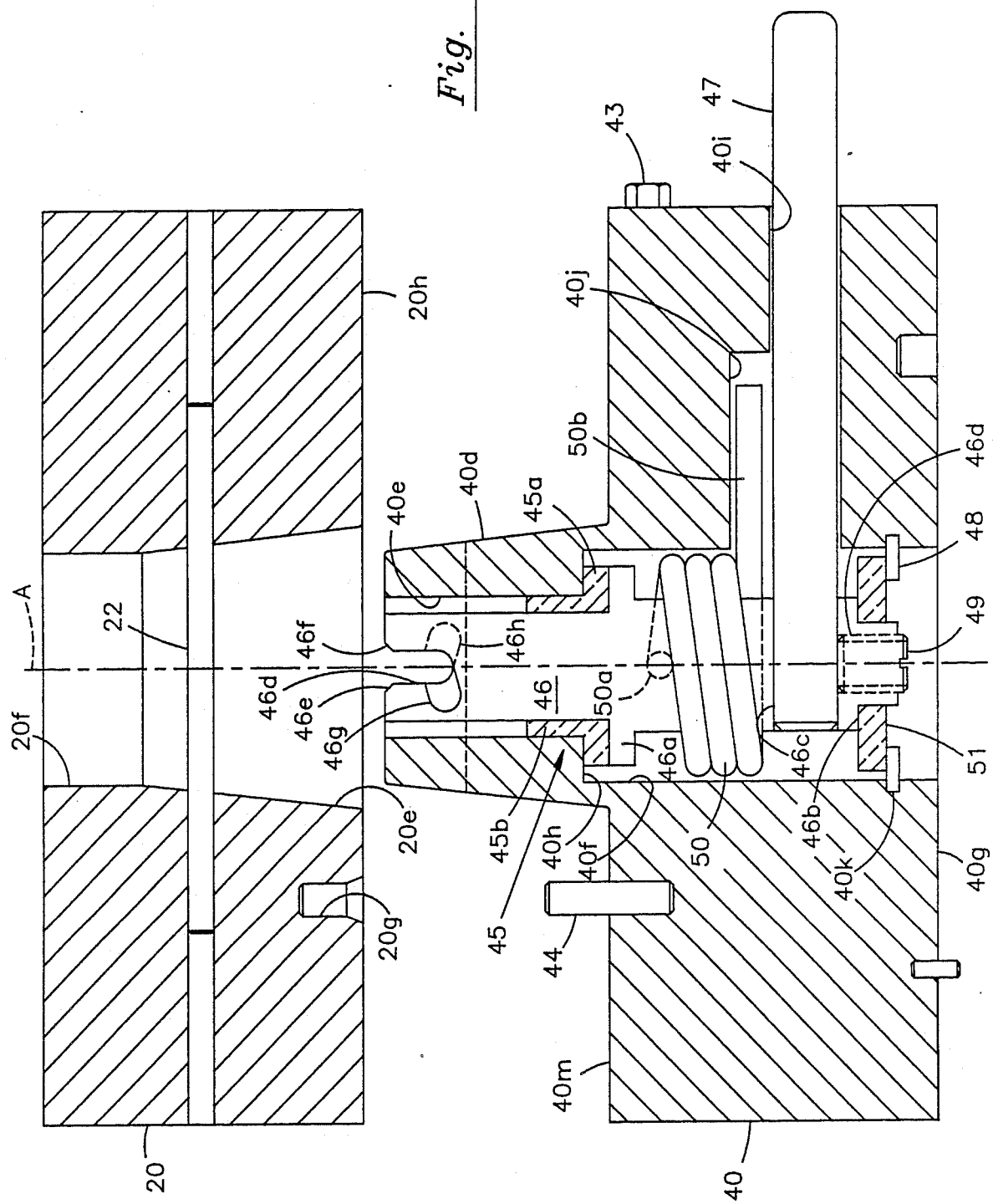

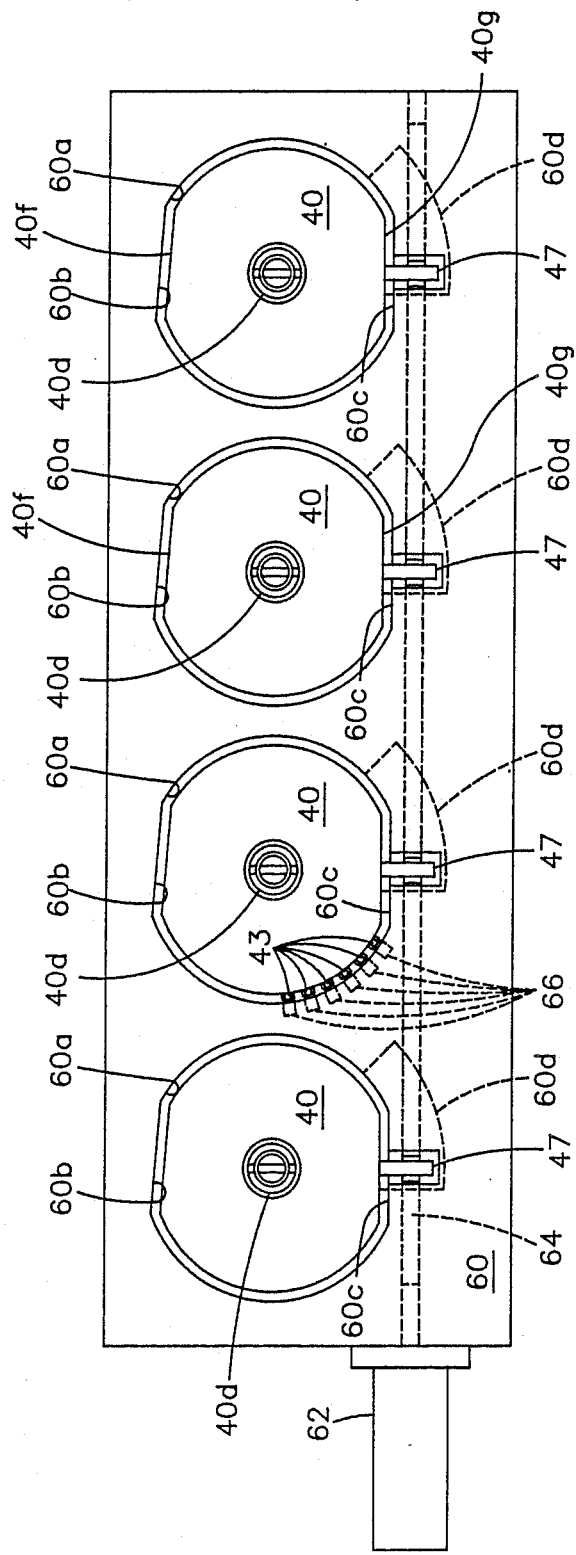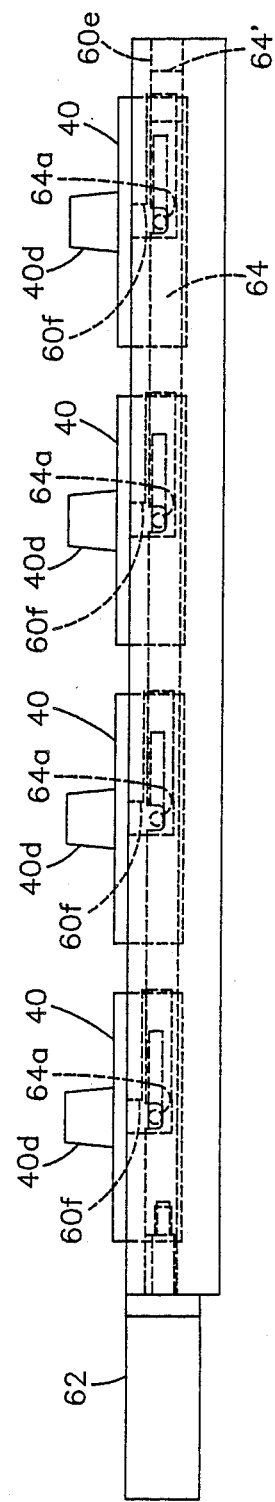

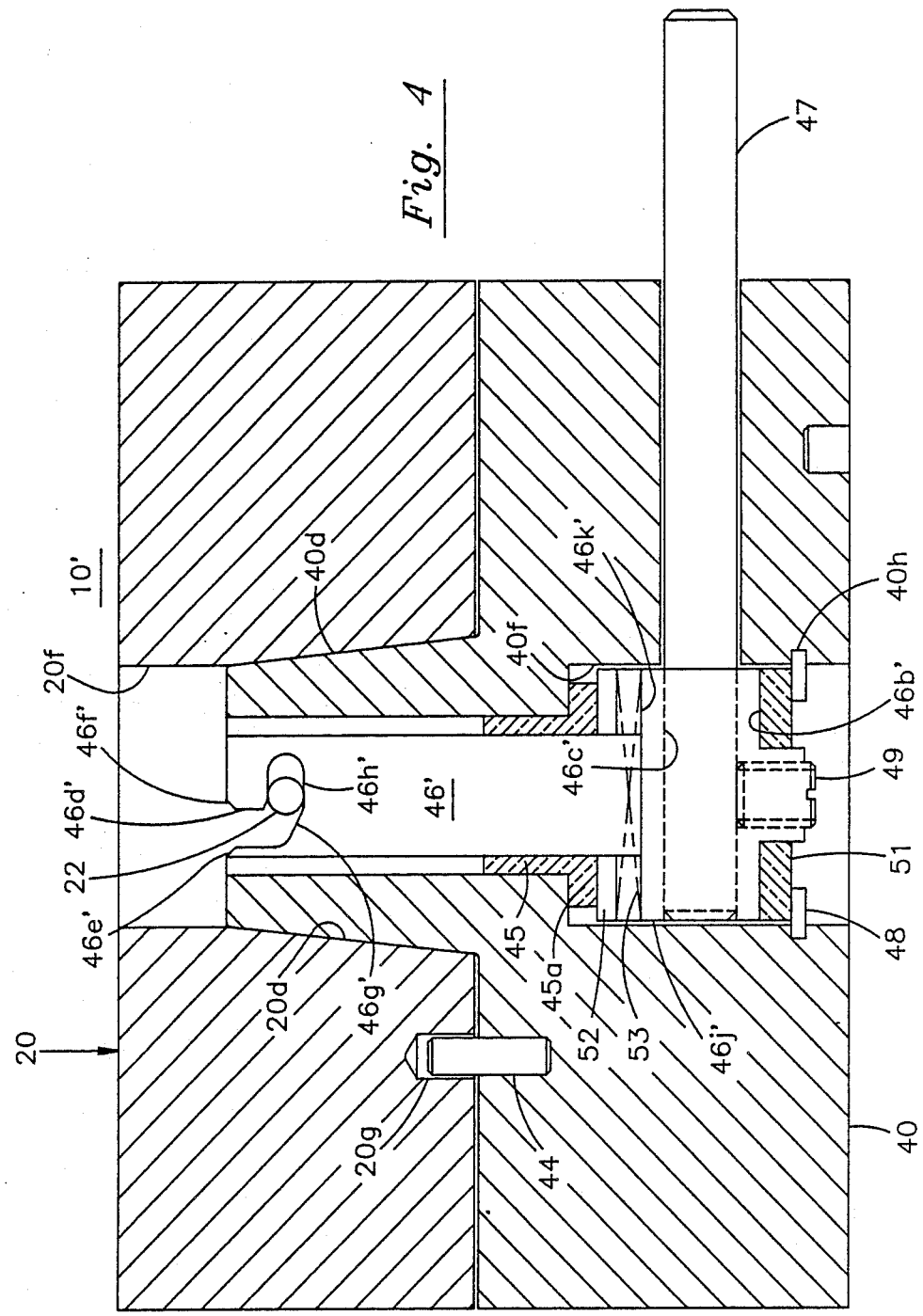

NOVEL AUTOMATIC TOOL CHANGER

FIELD OF THE INVENTION

The present invention relates to tool changers and more particularly to novel tool changers for coupling end effectors to robot arms of robotic systems, the coupling mechanism being small, light-weight and highly simplified in design while providing an effective precision interlocking of mating flanges.

BACKGROUND OF THE INVENTION

Presently available automatic tool changers typically utilize an internal air cylinder to actuate a gripping mechanism for locking two mating flanges together. In another present day technique, an internal actuator is utilized to push a tapered cup over steel balls forcing them into a groove to obtain a locking action. In still another a present day technique, tapered elements are rotated relative to one another to produce a locking effect through the employment of a eccentric collar. The major problem with present day tool changing devices is that they are typically large and heavy and the smaller units available on the market are incapable of providing an adequate number of electrical lines and pneumatic ports which is important in order to provide the capability of use with a variety of different end effectors.

BRIEF DESCRIPTION OF THE INVENTION

The present invention is characterized by providing small, light-weight higher precision automatic tool changer apparatus with a minimum of working components.

The automatic tool changing apparatus of the present invention is comprised of cooperating male and female flange members respectively coupled to a robot arm and an end effector. The female flange is provided with a tapered opening and a coupling rod spanning the walls of said opening and aligned perpendicular to the longitudinal axis of the opening. The male flange is provided with a tapered projection which conforms to the taper in the female flange. The tapered projection is hollow and houses a locking stud provided with an elongated slot tapered at its upper end for guiding the aforementioned rod into the slot as the mating flanges are brought into engagement. The tapered projection is also provided with a pair of slots to enable the rod to be lowered into the locking stud. When the cooperating rod reaches the base of the slot in the locking stud, the stud is rotated through an angle of approximately 35 degrees, whereby diagonally aligned offset notches provided in said stud and communicating with the slot are brought into engagement with the rod, causing the rod to be urged downwardly, thereby bringing the male and female tapers into intimate engagement. A torsion spring prevents the locking stud from rotating once moved to the locked position whereby the cooperating tapers assure proper alignment and concentricity between the mating flanges and hence the robot arm and end effector.

A cooperating pin and pin receiving opening are respectively provided on the male and female flanges at locations displaced at equal distances from the mating tapers and are brought into engagement with one another to assure proper angular orientation between the flanges and further to prevent rotation of the flanges relative to one another. The female flange has no moving parts, greatly simplifying the robot arm assembly and eliminating the need for any control capability on the robot arm to effect coupling and decoupling.

Each of the flanges is fixedly secured respectfully to a robot arm and an end effector. The female flange couples electrical and pneumatic lines extending through the robot arm to outlets on a face of the flange adapted to be positioned in close proximity to the adjacent flange surface of the male flange. The male flange is provided with stationary electrical terminals and tapered openings for the pneumatic couplings which respectively cooperate with spring-loaded conductive members forming part of the electrical circuits and with tapered projections forming part of the pneumatic circuits, the tapered projections being provided with O-rings to form an air-tight seal with the cooperating tapered openings in the female flange when the two flanges are mated.

The cooperating male flange and end effector mounted thereto are stored within a tool crib when not in use and are oriented in a predetermined position to facilitate coupling with the robot arm. The pneumatic and electrical lines extend through the male flange to the end effector secured thereto to provide appropriate electrical and/or pneumatic power. The nature and/or type of end effector coupled to the male flange is sensed by suitable sensors provided in the wall of the tool crib, which sensors cooperate with selectively removable elements arranged at spaced intervals about the periphery of the male flange, there being a sufficient number of the aforesaid selectively removable elements to form a binary code representative of a large number of different type end effectors, enabling the sensor means to sense the nature of the end effector, some selections being solderer, screw driver, and a variety of grippers for gripping different components such as micro chips, transformers, relays, impedence elements, and the like. The selectively removable elements may be changed in accordance with the end effector coupled to the male flange, it being understood that the male flange design renders it adaptable to any of the end effectors employed in the robotic system.

The tool crib in which the automatic tool changers and cooperating end effectors are stored is provided with either solenoid-operated or pneumatically-operated means for simultaneously moving the operating arms of all of the tool changers within the crib, enabling a robot arm to be removed from one of the tool changers, thereby avoiding the need for separate selective operating signals for each of the individual tool changers.

In still another embodiment of the present invention, the torsion spring is eliminated and replaced by a wave spring which serves to hold the locking stud in the locked position with the locking pin by exerting a force counter to the pull-up force exerted by the locking stud and which further exerts a frictional force which restrains the actuator arm from movement. This preferred embodiment compensates for tolerances that are experienced in manufacturing of the flanges and provides an operating arrangement which experiences less wear.

OBJECTS OF THE INVENTION AND BRIEF DESCRIPTION OF THE FIGURES

It is therefore one object of the present invention to provide tool changers for robotic devices and the like which are small, light-weight and which simply and yet accurately mount end effectors to robot arms with a high degree of precision.

Still another object of the present invention is to provide a novel automatic tool changing apparatus for use in robotic devices and the like including a cooperating locking stud and coupling rod to bring conforming tapers of male and female flanges into alignment to assure concentricity and perpendicularity therebetween.

Still another object of the present invention is to provide novel automatic tool changing apparatus for use in robotic devices and the like in which the cooperating tapers of male and female flanges are mated by means of a locking stud which urges a cooperating coupling rod into firm engagement therewith to provide precision alignment of the mating flanges through mechanical rotation of the locking stud by means of an operating arm provided in the male flange.

Still another object of the present invention is provide a novel automatic tool changing apparatus for use with robotic devices and the like in which the mating flange joined to an end effector is provided with a movable locking mechanism thus reducing the cooperating mating flange joined to the robot arm to a member having no moving parts whatsoever thereby greatly simplifying the functions of and reducing the complexity of the robot arm.

The above as well as other objects of the present invention will become apparent when reading the accompanying description and drawing in which:

FIG. 2 is an exploded sectional view showing the cooperating male and female flanges of FIG. 1 in greater detail.

FIG. 3 is a simplified top plan view showing the tool crib for housing the automatic tool changing apparatus of FIGS. 1 and 2.

FIG. 3a is an elevational view of the tool crib of FIG. 3.

FIG. 4 is a sectional view of another preferred embodiment of the present invention.

DETAILED DESCRIPTION OF THE INVENTION

Figure 1:
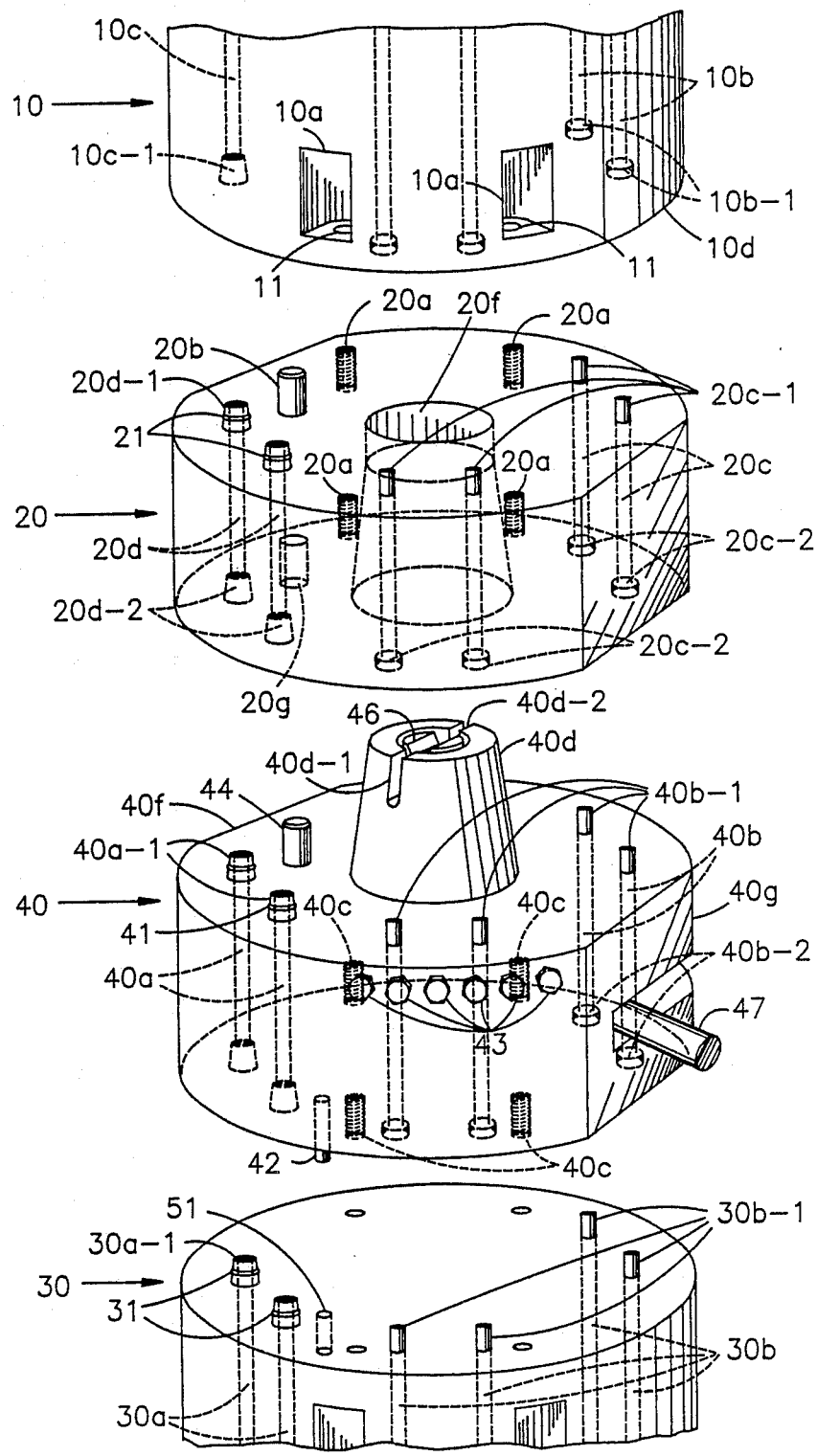
FIG. 1 shows an exploded perspective view of a portion of a robotic device employing the automatic tool changing apparatus of the present invention.

As was described hereinabove, the present invention is extremely advantageous for use in robotic devices wherein it is desired to provide automatic tool changing apparatus to enable simple, rapid changing of a tool an end effector and a robot arm. A portion of the robot arm 10 is shown in FIG. 1 for purposes of simplicity and is secured to female flange 20 by means of threaded fasteners 11 arranged at spaced intervals about the flange coupling end of robot arm 10 and extending through openings provided therein. Recesses 10a are provided in the peripherial surface of robot arm 10 to facilitate insertion of the threaded fasteners 11 into vertically aligned openings. The threaded fasteners 11 are of a length sufficient to extend beyond the bottom surface of robot arm 10 so as to threadedly engage tapped apertures 20a provided in female flange 20. An orientation pin 20b extends upwardly from the top surface of female flange 20 for insertion into a cooperating opening (not shown) in the bottom surface 10d of robot arm 10 to assure appropriate angular orientation between members 10 and 20.

The robot arm 10 is provided with a plurality of electrical lines 10b coupled to electrical sources (not shown) and having stationary terminals extending slightly below the bottom surface 10d of the robot arm. As many as six (6) or eight (8) such electrical lines may normally be provided, only a few of said lines being shown in FIG. 1 for purposes of simplicity. These electrical lines are connected with electrical lines 20c in female flange 20 and specifically with spring-loaded movably mounted conductive members 20c-1 which firmly engage an associated one of the stationary terminals 10b-1 to provide good electrical contact therebetween.

Pneumatic lines 10c extend through robot arm 10 and terminate in the bottom surface 10d thereof in the form of tapered opening 10c-1 which receive an associated tapered projection 20d-1 provided with an O-ring 21 for forming an air-tight seal between the cooperating tapers 10c-1 and 20d-1 when they are properly seated. The pneumatic lines 20d extend through the female flange and are provided with tapered openings which cooperate with tapered projections 40a-1 conforming to the tapered projections 20d-1 and provided with O-rings 41 for forming air-tight seals when projections 40a-1 are seated within tapered openings 20d-2. Pneumatic lines 40a extend downwardly to the bottom face of the male flange 40 to couple with tapered male projections 30a-1 provided with O-rings 31 for forming an air-tight seal when the cooperating tapered openings and projections are seated together. The pneumatic lines 30a extend to the device (not shown) forming part of end effector 30 which is operated by pneumatic pressure.

The male flange 40 is further provided with a plurality of spring-loaded conductive members 40b-1 which firmly engage associated ones of the stationary terminals 20c-2 extending just below the bottom surface of female flange 20. The electrical lines 40b extend through male flange 40 and are similarly coupled to electrical lines 30b in end effector 30 which lines are electrically connected to the stationary terminals 40b-2 extending just below the bottom surface of male flange 40 to provide electrical power to the end effector connected thereto through spring-loaded terminals and 30b-1 and lines 30b.

In the preferred embodiment, the number of pneumatic and electrical lines provided in the male and female flanges is preferably the maximum number. However, it should be understood that the end effector may utilize a lesser number of electrical and/or pneumatic lines dependent upon the function being performed by the end effector. However, it is advantageous to design the male and female flanges and especially the male flange to accomodate a variety of different end effectors, thus requiring a large number of electrical and pneumatic lines.

The end effector 30 is preferably joined to male flange 40 in a manner similar to the coupling between female flange 20 and robot arm 10. Male flange 40 is provided with a plurality of tapped openings 40c extending into the bottom face thereof for receiving threaded fasteners (not shown) similar to the threaded fasteners 11 described hereinabove for firmly securing male flange 40 to a mating portion of end effector 30. Proper orientation is achieved by means of pin 42 having its upper end integral with male flange 40 and its lower end extending downwardly for insertion into an alignment opening 31 provided in the mating surface of end effector 30.

Male flange 40 is further provided with a plurality of selectively removable members which may, for example, be threaded fasteners 43 formed of a suitable conductive material. The conductive members 43 are arranged at spaced intervals along an imaginary circle about the periphery of male flange 40 and collectively form a multiple bit binary code in which one binary state is represented by the presence of a conductive member and the opposite binary state is represented by the absence of the conductive member at each position. For example, providing six (6) such positions, a binary code of 64 different combinations can be provided to accomodate a variety of up to 64 different end effectors. These conductive member positions are sensed by sensor means provided in the tool crib to be more fully described hereinbelow to automatically and uniquely identify each end effector stored in the tool crib.

FIG. 2 is a sectional view showing the male 40 and female 20 connectors in greater detail and is principally confined to a showing of the elements thereof which cooperate to provide the automatic coupling and decoupling.

More specifically, female flange 20 has a central opening comprised of a lower tapered portion 20e which reduces to a smaller diameter and which communicates with upper opening portion 20f of substantially constant diameter. A hardened steel pin or rod 22 has its opposite ends anchored within the female flange member and extends across the upper portion of the tapered opening 20e. Pin 22 is perpendicular to the longitudinal axis A of the opening extending through female flange 20 and lies along a diameter thereof.

The alignment opening 20g cooperates with alignment pin 44 provided on male flange 40 and is positioned a predetermined displacement distance offset from female taper 20e.

Male flange 40 is provided with a tapered projection 40d which taper substantially conforms to the taper of tapered opening 20e in female flange 20. An opening 40e extends through the tapered projection and increases to a larger diameter opening 40f which extends to the bottom surface 40g of male flange 40. A shoulder 40h arranged between the smaller and larger diameter openings 40e and 40f seats a bushing 45 whose flange portion 45a rests upon shoulder 40h and whose hollow cylindrical portion 45b extends upwardly into opening 40e so as to slidably engage stud 46 which extends into bushing 45 and is provided with a flange 46a which rests against and slidably engages flange 45a of bushing 45. The lower end of stud 46 is provided with a recess 46b which seats a thrust bushing 51 which is held in place by resilient C-clip 48, retained in position in an annular recess 40k provided in the inner periphery of opening 40f at the lower end thereof. Thus, bushing 45, C-clip 48 and thrust bushing 47 serve to retain locking stud 46 against any linear movement relative to female flange 40 while permitting angular rotation thereof.

Locking stud 46 is provided with an opening 46c receiving the left-hand end of an operating arm 47 comprised of an elongated rod which extends toward the right through an opening 40i in male flange 40 so as to be rotatable through an angle of the order of 35 degrees. Operating arm 47 is secured to locking stud 46 by set screw 49 threadedly engaged within a tapped opening 46j provided in the lower end of locking stud 46 which protrudes through the central opening provided in thrust bushing 51.

Tapered projection 40d has a pair of diametrically opposed slots 40d-1, 40d-2 (see FIG. 1) for receiving rod 22 as will be more fully described.

A helically wound torsion spring 50 is wrapped about an intermediate portion of locking stud 46 and has its upper end 50a extending into an opening in locking stud 46 thereby securing the upper end of torsion spring 50 to locking stud 46. The opposite (lower) end 50b of torsion spring 50 extends into a recess 40j provided in male flange 40.

The upper end of locking stud 46 is provided with a slot 46d arranged along a diameter of locking stud 46 and having bevelled edges 46e, 46f at the upper end thereof to aid in the guiding of pin 22 into slot 46d. The lower end of slot 46d is machined to provide two diagonally aligned slots 46g, 46h which communicate with the lower end of vertically aligned slot 46d and extend diagonally downward and away from slot 46d for receiving and embracing pin 22 in a manner to be more fully described.

The operation of the releasable locking mechanism is as follows:

The robot having the robot arm 10 and female flange 20 mounted thereto is moved over the male flange 40 arranged within the tool crib 60 (to be more fully described) and is moved to bring the female taper 20e directly above and into alignment with the male tapered projection 40d. The robot arm 10 is lowered and rotated to bring pin 22 into alignment with slots 40d-1 and 40d-2 and with slot 46d (which is aligned with slots 40d-1 and 40d-2). The robot arm is lowered to lower pin 22 into slots 40d-1 and 40d-2 and the base of slot 46d. Appropriate alignment between the flanges 20, 40 is assured through the entry of alignment pin 44 into cooperating alignment opening 20g whose entry portion is tapered to facilitate guidance of the alignment pin 44 into the opening 20g. Once the pin 22 is seated against the base of slot 46d, operating arm 47 is moved (by means to be more fully described) to rotate locking stud 46 about its longitudinal axis causing pin 22 to be urged downwardly as it enters into the diagonally aligned slots 46g and 46h. The rotation of locking stud 46 causes the flanges 20 and 40 to be drawn together until the tapers 20e–40d are seated together. When the tapers are seated together there remains a gap of approximately 0.010 inch between the adjacent faces 20h–40h of the two flanges. Thus, the flanges do not rely on surface flatness for accuracy in alignment but rely on the tapers 20e–40d for assuring concentricity and perpendicularity therebetween. The flanges are prevented from rotating by pin 44 which is inserted into cooperating locating pin 20g. In addition to preventing rotation between flanges 20 and 40 pin 44 and opening 20g, in cooperation with the tapers 20e and 40d, assure appropriate orientation and alignment between the pneumatic and electrical terminals of female flange 20 and the cooperating pneumatic and electrical terminals of male flange 40.

Torsion spring 50 maintains a spring force acting against the upper pull of the locking stud 46, thereby holding it in the locked position as well as preventing the locking stud from rotation. Torsion spring 50 is under sufficient tension in the vertical direction to retain the cooperating tapers 20e and 40d in intimate engagement.

Although a gap spacing of 0.010 inches is maintained between the adjacent surfaces 20h and 40m of the male and female flanges, the stationary terminals 20c-2 provided in female flange 20 extend slightly below surface 20h and the spring loaded cooperating conductive pins 40b-1 extend slightly above surface 40h so as to make firm electrical engagement. Similarly, the pneumatic nipples 40a-1 mate with associated tapered ports 20d-2 in the female flange, the height of the nipples 40a-1 being sufficient to assure a good air-tight connection between the cooperating nipples and ports further aided by the O-ring arranged within an annular recess formed in nipples 40a-1.

The conductive gripper identification contacts 43 are engaged by mating sensing contacts 66 in the tool crib 60 shown in FIG. 3. In the preferred embodiment, contacts 43 provide a six bit binary number, the binary number being determined by the presence and/or absence of each of the conductive contacts. The combination of contacts remaining together with those removed serves to uniquely identify the end effector associated therewith.

FIG. 4 shows another alternative embodiment of the present invention in which like elements have been designated by like numerals as between FIGS. 2 and 4. The embodiment 10' of FIG. 4 differs from that shown in FIG. 2 in that the locking stud 46' is provided with a modified insertion slot for locking pin 22 and with a central portion of enlarged diameter as compared with the embodiment shown in FIG. 2.

Locking stud 46' has an upper portion which extends through bushing 45 so as to be freely rotatably therein. The lower end of stud 46' contains a recess 46b' which seats thrust bushing 51 which is held in pace by resilient C-clip 48 retained within recess 40h. The portion 46j' of stud 46' is of enlarged diameter relative to the remaining portion of the stud such that its diameter is slightly less than the inner diameter of the cylindrical-shaped opening 40f receiving stud 46'. Opening 46c' receives operating arm 47 in a manner similar to that shown in FIG. 2. A washer 52, preferably formed of a metallic material such as steel, is positioned against flange 45a of bushing 45 and is sandwiched between the upper shoulder 46k' of enlarged diameter portion 46j'. Washer 52 is a wave spring 53 which may, for example, preferably be an annular shaped resilient metallic member having an undulating configuration. Wave spring 53 normally urges locking stud 46' downwardly relative to bushing 45 and washer 52.

The upper end of locking stud 46' is provided with a substantially vertically aligned slot 46d' and having beveled edges 46e', 46f' at the upper end thereof to aid in the guiding of locking pin 22 into slot 46d'. The lower end of slot 46d' is provided with two diagonally aligned slots 46g', 46g' which communicate with the lower end of vertically aligned slot 46d' and extend diagonally downwardly and away from slot 46d' to receive locking pin 22. The tapered portions 46g', 46g' each terminate in a level portion 46h'. The male flange 40, similar to that shown in FIG. 2, is further provided with a set screw 49 for retaining operating arm 47 in opening 46c'.

The manner in which the male flange 40 of FIG. 40 is coupled to female flange 20 is substantially similar to that of the embodiment of FIG. 2 wherein tapered projection 40d is inserted into tapered opening 20e. Locking stud 46' is aligned to receive locking pin 22. With slot 46f' and locking pin 22 in alignment, male flange projection 40d is moved more deeply into tapered opening 20e until locking pin 22 reaches the tapered portion 46g'. The actuator arm 47 is rotated causing locking stud 46' to pull up on locking pin 22. With the tapered portion seated, locking stud 46' is pulled against wave spring 53 urging the spring to undergo compression, thus setting the pull-up force. Continued rotation of actuator arm 47 causes locking pin 22 to rest in the flat portion 46h' of the locking stud slot. The internal friction created by the wave spring upon washer 52 and shoulder 46k' retains actuator arm 47 in the locked position. The arrangement of FIG. 4 compensates for any errors in manufacturing tolerances of the inter-connected members of the flanges as well as significantly reducing wearing of components as a result of repeated use.

FIGS. 3 and 3a show the tool crib 60 for storing and automatically coupling and decoupling tools, i.e. end effectors, from robot arms. Tool crib 60 is provided with a plurality of openings 60a each adapted to receive an end effector and cooperating male flange fastened thereto. Each opening is provided with a pair of flats 60b, 60c arranged offset from a diameter of the opening and adapted to cooperate with flats 40f, 40g (see FIG. 1) provided along the periphery of each male flange 40. The tool crib 60 is further provided with a plurality of substantially triangular-shaped slots 60d communicating with an associated one of the openings 60a for permitting the free swingable movement of the operating arm 47 of an associated male flange 40 either of the type shown in FIG. 2 or the type shown in FIG. 4. A single control rod 64 is slidably arranged in elongated slot 60e communicating with each of the triangular-shaped slots 60d to permit reciprocating movement of the elongated control rod 64, which is provided with a plurality of U-shaped slots 64 each adapted to receive the free or right-hand end of the operating arm 47 for each male flange 40. A solenoid-operated control 62 moves the common control arm 64 between an extreme right-hand position shown in solid line fashion in FIG. 3a and dotted line position 64' in which common control rod 64 is displaced to the left.

Tool crib 60 is further provided with a plurality of elongated, vertically aligned slots 60f to permit control arm 47 to be lifted out of or alternatively replaced into the tool crib 60.

The operation of the tool crib 60 is as follows:

The male flanges and their cooperating end effectors are arranged within the tool crib with the flats 40f, 40g of each male flange cooperating with associated flats 60b, 60c in each flange receiving opening. The end effector extends downwardly more deeply into the tool crib and in a cavity (not shown for purposes of simplicity) for housing the end effector.

The control relay 62 is operated to maintain the coupling studs 46 of each male flange in the open position in readiness for receiving a female flange. The robot arm is moved to a position over the desired end effector determined by the sensors 66. When a female flange is lowered into position, as was previously described, and once the rod 22 is seated at the base of the slot 46d, control 62 is operated to rotate all of the operating arms 47, obviously including the operating arm of the male flange receiving the aforesaid female flange, firmly securing and precisely aligning the cooperating male and female flanges relative to one another. The cooperating flats in the tool crib and on the male flange prevent the male flange from rotating during the rotation of the operating arm 47. With all of the operating arms maintained in the locked position, each such arm is in alignment with an associated vertical slot 60f whereupon upward movement of the robot arm with the female flange and end effector now securely attached thereto, moves the male flange and associated end effector which are free to be lifted out of the tool crib and moved to a job site to perform a robotic function.

The disassembly of an end effector takes place in a similar fashion whereby the robot arm with a male flange and end effector coupled thereto is returned to an open tool holder in the tool crib. The end effector and male flange are lowered into the tool holder in the tool crib so that the operating arm 47 is received in the associated vertically aligned slot 60f. Once the male flange and end effector are properly seated within the tool crib, control means 62 is operated to move the operating arm and hence locking stud 46 to the open position whereupon the robot arm and its female flange are disengaged from the male flange and are free to be lifted upwardly and positioned over another end effector and cooperating male flange stored in another tool holder in the tool crib for coupling thereto in order to perform another robotic function.

The selection of an end effector is facilitated by the contacts of group 43 which are sensed by cooperating spring-loaded sensor elements 66 arranged about the inner periphery of each tool crib opening 60a, (only one such set of sensors being shown in FIG. 3 for purposes of simplicity) in order to establish the nature of the end effector stored therein.

Although the tool crib shown is limited to the storage of four (4) end effectors and cooperating male flanges, it should be understood that a greater or lesser number of cooperating end effectors and male flanges may be accomodated.

A latitude of modification, change and substitution is intended in the foregoing disclosure, and in some instances, some features of the invention will be employed without a corresponding use of other features. Accordingly, it is appropriate that the appended claims be construed broadly and in a matter consistent with the spirit and scope of the invention herein described.

We claim:

1. Tool changing means for automatically coupling and decoupling first and second members comprising a first flange adapted to be coupled to one of said first and second members and a second flange adapted to be coupled to the remaining one of said first and second members;

said first flange having a tapered opening and stationary coupling means extending across said tapered opening;

said second flange having a tapered projection adapted to be inserted into said tapered opening;

said tapered projection having radially aligned slots for receiving said coupling means;

locking means arranged for movement within said tapered projection and having a receiving portion for receiving said coupling means; and said locking means being movable to a first position causing said coupling means to draw said tapers into intimate contact and a second position for releasing said coupling means.

2. The changing means of claim 1 wherein said coupling means comprises a rod positioned within said tapered opening.

3. The changing means of claim 2 wherein the longitudinal axis of said rod is substantially perpendicular to the longitudinal axis of said tapered opening.

4. The changing means of claim 3 wherein said rod extends substantially along a diameter of said tapered opening.

5. The changing means of claim 1 further comprising an operating handle coupled to said locking means and extending through a slot in said second flange for swingable movement between first and second positions to respectively move said locking means to its first and second positions.

6. The changing means of claim 5 further comprising a bushing positioned within the opening in said second flange for rotatably supporting said locking means.

7. The changing means of claim 6 wherein the opening in said second flange is provided with a bushing support shoulder;

said bushing having a flange resting against said bushing support shoulder;

said locking means comprising a stud having a locking end, a supporting end, and an intermediate flange resting against said bushing;

said bushing surrounding a portion of said stud adjacent to said stud flange.

8. The changing means of claim 7 further comprising a thrust bushing having a central opening for slidably receiving a projection on the supporting end of said stud opposite said locking end;

a resilient C-clip being inserted within an annular recess provided in the opening of said second flange for retaining said thrust bushing in slidable engagement with said stud.

9. The changing means of claim 5 wherein said tapered projection is provided with a pair of slots aligned with said locking means enabling said locking means and engaging means to enter said slot and to thereby be received by said locking means.

10. The changing means of claim 1 wherein said locking means comprises an elongated rod-shaped member rotatably mounted within an opening in said tapered projection, said tapered projection terminating in a free end extending outwardly from said first flange, said opening extending through the center of said tapered projection;

said rod-shaped member having a first end positioned adjacent to the free end of said tapered projection;

said first end of said rod-shaped member being provided with a slot extending inwardly from said first end for receiving said coupling means; and said slot being provided with at least one offset slot portion extending diagonally downwardly and outwardly from said axially aligned slot for drawing said coupling means and hence said first flange downwardly toward said second flange when said locking means is moved to its first position.

11. The changing means of claim 10 wherein said slot is further provided with an end slot portion communicating with said offset slot for receiving said locking pin as the locking pin leaves the offset slot.

12. The changing means of claim 1 wherein the tapered projection conforms to the tapered opening to properly align the first and second flange when the tapered projection and the tapered opening are in firm engagement.

13. The changing means of claim 12 further including bias means arranged within said second flange for retaining said locking means in its present position.

14. The changing means of claim 13 wherein said bias means comprises a torsion spring arranged within said tapered opening and said second flange and encircling said locking means;

a first end of said torsion spring engaging said locking means;

a second end of said torsion spring defining a tang extending outwardly and aligned substantially in a radial direction;

said second flange being further provided with a recess communicating with said tapered opening enabling said torsion spring and tang to move within said recess;

said tang engaging one surface of said recess when said locking means is in its first position to prevent rotation of said locking means.

15. The changing means of claim 13 wherein said bias means comprises a wave spring encircling said locking means;

said locking means having an enlarged diameter portion arranged within a part of said opening in said second flange having an increased diameter for receiving said large diameter portion of said locking means; said locking means having a shoulder adjacent to said enlarged diameter portion;

said wave spring being positioned between said shoulder on said locking means and a shoulder provided in said opening in said second flange for biasing said locking means in a direction away from said coupling means.

16. The changing means of claim 15 further comprising bushing means arranged in said second flange, said bushing means having a flange resting against the shoulder provided in said second flange, said bushing means providing for rotatable mounting of said locking means in said second flange opening, said bias means being arranged between said bushing flange and said locking means shoulder.

17. The changing means of claim 16 further comprising a washer arranged between said bias means and the flange of said bushing means to reduce wearing of said bushing means.

18. The changing means of claim 1 wherein said locking means comprises an elongated rod-shaped member rotatably mounted within an opening in said second flange, said opening extending through the center of said tapered projection, said tapered projection terminating in a free end extending outwardly from said first flange;

said rod-shaped member having a first end positioned adjacent to the free end of said tapered projection;

said first end being provided with an axially aligned slot extending inwardly from said first end for receiving said coupling means; and said slot being provided with at least one offset slot portion extending diagonally downward and outward from said axially aligned slot for drawing said coupling means and hence said first flange toward said second flange when said locking means is moved to its first position.

19. The changing means of claim 18 wherein said slot is further provided with an end slot portion communicating with said offset slot for receiving said locking pin as the locking pin leaves the offset slot.

20. The changing means of claim 1 wherein said locking means comprises an elongated rod-shaped member rotatably mounted within an opening in said second flange, said opening extending through the center of said tapered projection, said tapered projection terminating in a free end extending outwardly from said first flange;

said rod-shaped member having a first end positioned adjacent to the free end of said tapered projection;

said first end being provided with an axially aligned slot extending inwardly from said first end for receiving said coupling means; and said slot being provided with a pair of offset slot portions extending diagonally downward and outward from said axially aligned slot for drawing said coupling means and hence said first flange toward said second flange when said locking means is moved to its first position.

21. The changing means of claim 1 wherein one of said first and second flanges is provided with an alignment pin extending from one surface thereof;

said pin being displaced in a radial direction from said tapered projection;

the remaining one of said first and second flanges being provided with a cooperating opening provided in one surface of said remaining one of said first and said second flanges arranged to lie adjacent to the surface containing said alignment pin for slidably receiving said alignment pin when said tapered projection is seated in said tapered opening.

22. The changing means of claim 21 wherein a gap space is provided between the aforementioned adjacent surfaces of said first and second flanges to maintain said adjacent surfaces in spaced parallel fashion when the tapered projection is seated in the tapered opening.

23. The changing means of claim 22 wherein said spacing is of the order of 0.010 inches.

24. The changing means of claim 22 wherein said first flange is provided with power delivery lines extending therethrough;

said power delivery lines terminating in coupling terminals;

said second flange being provided with power coupling lines terminating in coupling terminals at the face of the second flange carrying said tapered projection;

the coupling terminals of said first and second flanges being in alignment and adapted to convey power through said first and second flanges.

25. The changing means of claim 1 wherein the periphery of said second flange is provided with a plurality of removable identification contacts extending at spaced intervals about the periphery of said second flange;

holding means for holding said second flange in position preparatory for coupling to said first flange;

said holding means including a recess for receiving at least a portion of said second flange;

said holding means including sensing means for sensing the identification contacts arranged along said second when it is positioned in said holding means for identifying said second flange.

26. The changing means of claim 25 wherein said second flange is provided with a substantially cylindrical-shaped periphery having at least one surface irregularity;

the recess in said second flange holding means conforming to the shape of the periphery of said second flange for properly orienting said second flange in said holding means and for preventing said second flange from rotating in said holding means.

27. The changing means of claim 26 wherein said surface irregularity comprises a flat planar surface.

28. The changing means of claim 26 wherein said surface irregularity comprises a pair of planar surfaces displaced at angular positions about the cylindrical periphery of said second flange.

29. The changing means of claim 25 wherein said holding means is provided with an elongated recess communicating with said second flange for slidably receiving said operating arm and a horizontally aligned recess communicating with said second flange receiving opening and said vertically aligned recess to permit movement of said operating arm; and means on said holding means for moving said operating arm to operate said locking means between said first and second positions.

* * * * *

UNITED STATES PATENT AND TRADEMARK OFFICE
CERTIFICATE OF CORRECTION

PATENT NO. : 4,875,275

DATED : October 24, 1989

INVENTOR(S) : Hutchinson et al.

It is certified that error appears in the above-identified patent and that said Letters Patent is hereby corrected as shown below:

Column 6, line 46, change "40h" to --40m--

Column 7, line 30, change "pace" to --place--

Column 12, line 53, after "second" insert --flange--

Signed and Sealed this

Fifteenth Day of October, 1991

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,875,275

DATED : October 24, 1989

INVENTOR(S) : Hutchinson et al

It is certified that error appears in the above-identified patent and that said Letters Patent is hereby corrected as shown below:

On the title page, item [57]:

In the Abstract, line 27 (last line), delete "coupling." and insert --couplings when the flanges are engaged. Identifying pins on the male flange identify the type of end effector.--

Signed and Sealed this

Sixteenth Day of March, 1993

*Attest:*

STEPHEN G. KUNIN

*Attesting Officer*    *Acting Commissioner of Patents and Trademarks*